(12) United States Patent
Eigel

(10) Patent No.: US 9,908,526 B2
(45) Date of Patent: *Mar. 6, 2018

(54) EMERGENCY ASSISTANCE FOR CONTROLLING A VEHICLE

(71) Applicant: VOLKSWAGEN AKTIENGESELLSCHAFT, Wolfsburg (DE)

(72) Inventor: Thomas Eigel, Berlin (DE)

(73) Assignee: Volkswagen AG (DE)

( * ) Notice: Subject to any disclaimer, the term of this patent is extended or adjusted under 35 U.S.C. 154(b) by 147 days.

This patent is subject to a terminal disclaimer.

(21) Appl. No.: 14/895,506

(22) PCT Filed: May 9, 2014

(86) PCT No.: PCT/EP2014/059571
§ 371 (c)(1),
(2) Date: Dec. 3, 2015

(87) PCT Pub. No.: WO2014/195085
PCT Pub. Date: Dec. 11, 2014

(65) Prior Publication Data
US 2016/0107644 A1    Apr. 21, 2016

(30) Foreign Application Priority Data

Jun. 4, 2013   (DE) .................. 10 2013 009 400

(51) Int. Cl.
*G06F 7/70*    (2006.01)
*G06F 19/00*   (2011.01)
(Continued)

(52) U.S. Cl.
CPC ............. *B60W 30/09* (2013.01); *B60K 28/06* (2013.01); *B60K 28/066* (2013.01); *B60W 10/04* (2013.01);
(Continued)

(58) Field of Classification Search
CPC ................. B60W 30/09; B60W 50/16; B60W 2040/0818; B60W 50/14; B60L 28/066
(Continued)

(56) References Cited

U.S. PATENT DOCUMENTS 5,585,785 A * 12/1996 Gwin .................... G08B 21/06
                                                                180/271
6,489,887 B2 * 12/2002 Satoh ................... G05D 1/0246
                                                                340/435
(Continued)

FOREIGN PATENT DOCUMENTS

DE          10338760 A1       3/2005
DE      102004024692       * 12/2005 ............ B60W 10/20
(Continued)

OTHER PUBLICATIONS

Waldmann et al.; The Emergency Stopping Assistant—Safe Stopping in the Event of Sudden Incapacity of a Vehicle Driver to Drive; 3rd German AAL Conference; Jan. 26-27, 2010; Berlin, Germany.
(Continued)

*Primary Examiner* — Isaac G Smith
(74) *Attorney, Agent, or Firm* — Barnes & Thornburg LLP

(57) ABSTRACT

A method and device for transferring a vehicle travelling with lateral guidance support into a driving state with a reduced risk of the consequences of a collision in the event of the driver experiencing an emergency, wherein the speed of the vehicle is higher than a predefined limiting speed. The method detects a hands-off situation of the driver and outputs a hands-off warning in a hands-off phase and carries out a warning escalation in an escalation phase if there is no reaction to the hands-off warning, wherein initiation of the escalation phase is prevented if a predefined blocking condition is satisfied.

10 Claims, 2 Drawing Sheets

(51) Int. Cl.

| | | |
|---|---|---|
| *G06G 7/00* | (2006.01) | |
| *B60W 30/09* | (2012.01) | |
| *B60W 50/14* | (2012.01) | |
| *B60K 28/06* | (2006.01) | |
| *B62D 15/02* | (2006.01) | |
| *B60W 30/12* | (2006.01) | |
| *B60W 30/14* | (2006.01) | |
| *B60W 10/04* | (2006.01) | |
| *B60W 10/18* | (2012.01) | |
| *B60W 10/30* | (2006.01) | |
| *B60W 30/02* | (2012.01) | |

(52) U.S. Cl.
CPC ............ *B60W 10/18* (2013.01); *B60W 10/30* (2013.01); *B60W 30/02* (2013.01); *B60W 30/12* (2013.01); *B60W 30/146* (2013.01); *B60W 50/14* (2013.01); *B62D 15/025* (2013.01); *B62D 15/0265* (2013.01); *B60W 2520/10* (2013.01); *B60W 2540/00* (2013.01); *B60W 2540/26* (2013.01); *B60W 2710/18* (2013.01); *B60W 2710/30* (2013.01); *B60W 2720/10* (2013.01)

(58) Field of Classification Search
USPC .......................................... 701/70; 340/575
See application file for complete search history.

(56) References Cited

U.S. PATENT DOCUMENTS

| | | |
|---|---|---|
| 2007/0219688 A1 | 9/2007 | Gut et al. |
| 2011/0001617 A1* | 1/2011 | Roeike ................ B60T 8/17558 340/439 |
| 2012/0173068 A1 | 7/2012 | Seiter et al. |
| 2013/0124046 A1* | 5/2013 | Lazic ................... B60K 28/066 701/42 |

FOREIGN PATENT DOCUMENTS

| | | |
|---|---|---|
| DE | 102004024692 A1 | 12/2005 |
| DE | 102006052481 A1 | 5/2008 |
| DE | 102006056094 A1 | 5/2008 |
| DE | 102007043604 A1 | 3/2009 |
| DE | 102009028647 A1 | 2/2011 |
| DE | 102009041187 A1 | 2/2011 |
| DE | 102010062012 A1 | 5/2012 |
| DE | 112009004689 T5 | 10/2012 |
| EP | 2591942 A1 | 5/2013 |
| JP | H10198876 A | 7/1998 |
| JP | 2003058993 A | 2/2003 |

OTHER PUBLICATIONS

Search Report for German Patent Application No. 10 2013 009 400.3; dated Oct. 21, 2013.
Search Report for International Patent Application No. PCT/EP2014/059571; dated Jul. 10, 2014.

* cited by examiner

EMERGENCY ASSISTANCE FOR CONTROLLING A VEHICLE

PRIORITY CLAIM

This patent application is a U.S. National Phase of International Patent Application No. PCT/EP2014/059571, filed 9 May 2014, which claims priority to German Patent Application No. 10 2013 009 400.3, filed 4 Jun. 2013, the disclosures of which are incorporated herein by reference in their entirety.

FIELD

Illustrative embodiments relate to a method for transferring a vehicle traveling with activated lateral guidance support into a driving state with a reduced risk of the consequences of a collision in the event of the driver experiencing an emergency, that is to say to emergency assistance and to a corresponding emergency assistance system.

BACKGROUND

In the field of active safety of a motor vehicle, contemporary driver assistance systems are already able to perform driving tasks of the driver of a motor vehicle and to carry out partially automated or partially autonomous driving functions. This is manifest in the examples of adaptive cruise control or lane assist or heading control.

Illustrative embodiments provide a method and a device, wherein a vehicle traveling at high speed is transferred into a driving state with a reduced risk of the consequences of a collision when it is assumed that the driver is experiencing an emergency. In this context, the intention is to avoid as far as possible misuse of the emergency system by the driver.

BRIEF DESCRIPTION OF THE FIGURES

Disclosed embodiments will be explained below with reference to the drawings, in which.

DETAILED DESCRIPTION OF THE DISCLOSED EMBODIMENTS

Figure 1:
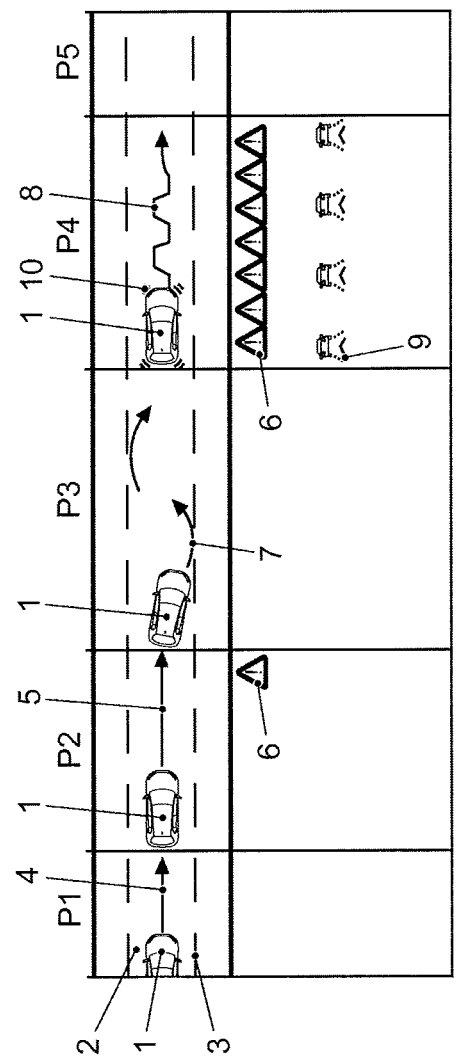
FIG. 1 shows a schematic functional description of the emergency method.

The disclosed method for transferring a vehicle traveling with lateral guidance support into a driving state with a reduced risk of the consequences of a collision in the event of the driver experiencing an emergency, wherein the speed of the vehicle is higher than a predefined speed limit, comprises the following steps:

Detecting a hands-off situation of the driver and outputting a hands-off warning in a hands-off phase, and Carrying out a warning escalation in an escalation phase if there is no reaction to the hands-off warning, wherein initiation of the escalation phase is prevented if a predefined blocking condition is satisfied.

Since, after the detection of a hands-off situation, it is not possible to draw conclusions as to whether the driver is physically incapable of exercising control over the vehicle, i.e. whether an emergency has occurred or whether a technically adept driver intends to implement autonomous driving by using the lateral guidance support, an attempt is made in an escalation phase to provoke a reaction of the driver or of the front seat passenger. Since it can be assumed that actual incapacity of the driver to drive is an improbable event, the disclosed emergency method becomes active only in extremely rare cases. The triggering of the emergency method by the hands-off detection has to be balanced against misuse by the driver who intentionally activates the method without need by letting go of the steering wheel. This is prevented by a predefined blocking condition. If the blocking condition is satisfied, initiation of the escalation phase and therefore initiation of the emergency method is prevented. This counteracts misuse of the emergency method.

The blocking condition may be a function of instances of triggering of the escalation phase which have already taken place. The blocking condition is therefore satisfied if the number of instances of triggering of the escalation phase is equal to a predefined value. In other words, after a defined number of instances of triggering of the escalation phase, no further triggering occurs in a case of a detected hands-off situation, and the emergency function is therefore blocked. In this context, the blocking could be configured in such a way that it can be eliminated only in a customer workshop. If such blocking of the emergency function is present, the lateral guidance support is deactivated after the hands-off warning in a customary fashion if no driver reaction to the hands-off warning occurs, since otherwise autonomous driving would be possible.

The number of instances of triggering of the escalation phase within one driving period may be equal to the predefined value. In other words, the number of instances of triggering of the escalation phase is limited to one driving period, wherein one driving period is defined by the starting of the vehicle and by the shutting down of the vehicle after the destination has been reached. The availability of the emergency method could therefore be limited, for example, to one instance of triggering within one driving period.

The vehicle speed may be reduced in an intervention phase to a speed which is lower than or equal to a speed limit, wherein the vehicle is kept on the current lane if there is no reaction to the escalation phase. All the longitudinal and lateral guidance as well as all the warnings are deactivated when the speed limit is reached.

In this way it is ensured that the speed of the vehicle which is traveling, for example, at a high speed on a freeway or road which is similar to a freeway is reduced in the event of an emergency to a speed range whose accident consequences can be coped with. In this context, the single and decisive triggering criterion which is adopted for the implementation of the emergency assistance is the detection of a hands-off situation, but this detection occurs for some time, for example for 10 seconds at maximum. If there is no reaction to the hands-off warning, the method goes into the escalation phase in which it is attempted to provoke the driver or, if appropriate, the front seat passenger to react. If no reaction occurs in this escalation phase either, the method goes into the intervention phase in which, on the one hand, the warning level is increased further and, on the other hand, the speed of the vehicle is reduced to extract collision energy from the rapidly traveling vehicle. If no driving intervention occurs in the intervention phase either, when the speed limit is reached or undershot all the assistance interventions and warnings are deactivated to prevent autonomous driving.

Since the vehicle which is moving at the speed limit is currently not in a stationary state, possible consequences of a collision of a tail-end accident are reduced owing to the comparatively low relative speed compared to a tail-end collision with a stationary vehicle.

The speed limit can depend on the lane on which the vehicle is located. It is therefore possible in the case of a three-lane freeway for the speed limit of the left-hand lane to be 100 km/h, the speed limit of the middle lane to be 60 km/h and that of the right-hand lane to be 40 km/h. It is also possible for the speed limit to be formed by the speed zero, i.e. for the vehicle to be braked to the stationary state in the intervention phase.

If the speed limit is higher than zero, starting from the time when the speed limit is reached and the lateral guidance support, and, if appropriate, the longitudinal guidance support, are switched off, it must be expected that the vehicle will be involved in an accident whose consequences are limited owing to the emergency speed which is low for a freeway or road which is similar to a freeway. In other words, the vehicle will end its journey in a foreseeable time, for example as a result of it leaving the roadway at a relatively low speed.

If the speed limit is zero, the vehicle remains in its lane.

In the escalation phase, the intervention of the lateral guidance support may take place at a later time compared to normal support, wherein the later time is selected as a function of the vehicle speed in such a way that the vehicle is prevented from exiting the current lane. In other words, in the escalation phase the vehicle is no longer kept in the center between the marks of the lane by the lateral guidance support but it swings to and fro between the lane marks. The intention of the swinging of the vehicle between the marks on the two sides of its current lane is to provoke the driver, if he is capable of driving, or the possible front seat passenger, to react, wherein in addition the display of the lateral guidance support can indicate the "switched off" state. Therefore, a conscious driver is given the impression that he is driving without lateral guidance support and that there is a risk of the vehicle leaving the roadway. In addition, the unusual driving behavior alerts the traffic in the surroundings of the vehicle to a possible complication and serves as a warning.

If there is still no reaction in the escalation phase, which can last, for example, up to 10 seconds, in particular 8 seconds, the suspicion of incapacity of the driver to drive becomes greater. However, it is not possible to rule out the possibility of the driver intentionally wishing to test the technology to its limits.

In the intervention phase, the warning escalation may also be intensified by virtue of the fact that at least the lateral guidance of the vehicle has a jerky lateral profile. In this way, in the intervention phase an attempt is also made to provoke a reaction by the driver or by a possible front seat passenger by means of an uncomfortable driving behavior of the vehicle. In addition, this unorthodox driving style clearly signals to the surroundings of the vehicle that something is wrong with the vehicle; and therefore a warning is issued to the surroundings of the vehicle. In this context, the speed of the vehicle is reduced in the intervention phase.

In addition, in the intervention phase braking jolts can be used for warning escalation. These braking jolts are intended to provoke a reaction on the part of the driver or front seat passenger. The braking jolts also have the additional effect here of issuing a warning to the surroundings of the vehicle. In addition, in the intervention phase the acoustic and/or visual signals can be intensified to cause the driver to react, and the flashing indicator warning system can be activated in the intervention phase to generate a further direct warning to the surroundings of the vehicle. Finally, to avoid a tail-end accident the vehicle can drive with activated longitudinal guidance support, wherein the longitudinal guidance support can be active or passive in the background.

The lateral guidance support may be actuated again in the escalation phase or the intervention phase by the driver only if a steering intervention of the driver is detected. After triggering of the emergency method, i.e. on entry into the escalation phase, an active steering intervention of the driver must therefore be occurring to terminate the emergency method on the driver's side and to make the lateral guidance support available again for the driver. Otherwise, the driver could signal a driver activity, for example by activating the ACC switch in the escalation phase or intervention phase, and would in this way again enter the hands-off phase in which lateral guidance support would be available to him again, without the driver having moved his hands to the steering wheel. In this way, it would be possible to drive for a relatively long time in a hands-free mode with steering support. This is prevented by the requirement for active steering intervention.

The disclosed device, which is configured for carrying out the method explained above for transferring a vehicle traveling with lateral guidance support into a driving state with a reduced risk of the consequences of a collision in the event of the driver experiencing an emergency, comprises:
  a longitudinal guidance apparatus,
  a lateral guidance apparatus,
  a hands-off detection apparatus,
  an emergency assistant for carrying out warning escalations and interventions into the driving functions of the vehicle as a function of the results of the hands-off detection apparatus, and
  a blocking apparatus for blocking the emergency assistant on the basis of satisfaction or non-satisfaction of a predefined blocking condition.

Since the emergency assistant will become active only in rare cases, it is necessary to avoid a technically adept driver using the device which comprises the emergency assistant for autonomous driving and driving, as it were, in a hands-free fashion. To counteract this, a blocking apparatus makes it possible to block the emergency assistant on the basis of a suitable blocking condition. If the blocking condition is not satisfied, the emergency assistant can become active. If the blocking condition is satisfied, the emergency assistant is blocked if a hands-off situation is detected and therefore the triggering situation would actually occur. In this way, autonomous driving can be prevented.

The blocking apparatus may block the emergency assistant as a function of instances of activation of the emergency assistant which have already occurred, wherein the blocking condition is satisfied if the number of instances of activation is equal to a predefined value. In this context, blocking can take place, for example, if the number of instances of activation of the emergency assistant which have already taken place has reached a predefined value. In this context it could be provided that the blocking of the emergency assistant which is caused by the blocking apparatus could be canceled only by a visit to a workshop. It is also conceivable to limit the number of instances of activation which is necessary to satisfy the blocking condition to one driving period. If, for example, the emergency assistant can be activated only once during one driving period, the conscious driver would have to definitively shut down the vehicle and activate it again to cancel the blocking of the emergency assistant again, which in the case of travel on a freeway requires at least the closest car park to be made for.

After a positive hands-off detection, the emergency assistant may carry out the warning escalation in at least two successive driving phases, in particular an escalation phase and a subsequent intervention phase, wherein after the intervention phase has run without success and when a speed limit is reached the emergency assistant deactivates at least the longitudinal guidance apparatus and the lateral guidance apparatus.

The device may have an apparatus for detecting a driver steering activity. Driver-side activation of the lateral guidance support in the escalation phase and in the intervention phase can be brought about by means of the detection of the driver steering activity. By detecting an active steering intervention on the driver side it is possible to prevent the driver using the device for temporary hands-free driving.

FIG. 1 describes in a schematic illustration the mode of functioning of the method for transferring a vehicle 1 traveling with lateral guidance support into a driving state with a reduced risk of the consequences of a collision in the event of the driver supposedly experiencing an emergency, which method is implemented in an emergency assistant. The disclosed method reduces the speed of the vehicle 1 in a controlled fashion to an emergency speed, wherein the method is based on a hands-off detection.

In a first phase P1, a vehicle 1 is moving on a lane 2, for example of a freeway or of a road which is similar to a freeway, which lane 2 is delimited from adjacent lanes by marks 3. In this phase P1, the driver is incapable of driving and the vehicle 1 is moving with activated lateral guidance support along a driving trajectory 4 which keeps the vehicle 1 centrally on its lane 3 by means of the lateral guidance support, that is to say a lanekeeping assistant or lane assist. Longitudinal guidance, such as for example ACC, can be active or inactive here.

In the second phase P2, the hands-off phase, a hands-off apparatus detects that the driver of the vehicle 1 is no longer holding the steering wheel. After a sufficient period of time which is necessary to detect the hands-off and which can be between 2 and 10 seconds, a hands-off warning is issued by means of at least one acoustic warning which is symbolized by the warning signal 6 in FIG. 1. During the second phase P2 the lateral guidance support remains active and keeps the vehicle 1 along the central driving trajectory 5. After the expiry of the second phase P2 and the outputting of the hands-off warning, it is, however, not possible to draw conclusions as to whether the driver has intentionally or unintentionally no contact with the steering wheel, as has been explained already above.

If the driver of the vehicle 1 does not react to the hands-off warning indicator messages 8, this can indicate that the driver is intentionally driving in a hands-free fashion to test the automatic driving possibility of the lateral guidance. This needs to be prevented. The absence of steering interventions, detected by the hands-off detection, can, however, also mean that the driver of the vehicle 1 is not capable of driving. This can be caused by a medical emergency or by the driver falling asleep, for example, owing to excessive fatigue.

In the third phase P3, the escalation phase, the intention is therefore to make an attempt, independently for the reason of the lack of steering activity, to reactivate the driver or activate the front seat passenger. For this purpose, when the third phase P3 is entered, a first step of the warning escalation is carried out, and the intention is to give the driver or front seat passenger of the vehicle 1 the impression that the lateral guidance assistance is deactivated. This is brought about by virtue of the fact that the vehicle 1 is no longer kept in the center of the vehicle's own lane 2. In addition, the impression is given that the lateral guidance is deactivated in that the display of the lateral guidance is switched off. In the background, the emergency assistant 20, activated in the escalation phase P3, causes the lateral guidance of the vehicle 1 to intervene at a later time compared to the normal behavior of the lateral guidance, wherein the later time is, however, selected such that the vehicle 1 just fails to exit the lane 2. The vehicle oscillates, as it were, to and fro between the left-hand and right-hand marks 3 of the lane 2, along a driving trajectory 7 of the third phase P3. For the driver of the vehicle 1, who had, for example, fallen asleep briefly or who wished to test the technology to its limits, this gives the impression that the lateral guidance is deactivated and he must consequently assume responsibility for driving again. If the driver continues to remain inactive, which appears to make incapacity to drive more probable, this is also an urgent indication to a possible front seat passenger to become active then by, for example, taking over the steering or taking some other measure. Since the emergency assistant is activated in the background in this third phase P3, the vehicle 1 is kept in the lane 2 and cannot leave it.

If the driver of the vehicle 1 continues to exhibit no reaction, the method goes into the fourth phase P4, the intervention phase, in which, on the one hand, the warning escalation is intensified and, on the other hand, a reduction in the speed of the vehicle is brought about by a suitable intervention in the control of the vehicle 1. In other words, the emergency assistant then acts in the foreground. The further warning escalation can then be brought about by continuous acoustic warning, such as is illustrated schematically by the multiplicity of warning symbols 6 in FIG. 1. In addition, the vehicle 1 is placed in an unsteady state by brief braking jolts. To assist reactivation of the driver of the vehicle 1 or to trigger a reaction by the front seat passenger, the lateral guidance of the vehicle 1 is made uncomfortable. This is brought about by steering interventions which generate a jerky lateral profile, as is illustrated symbolically by the driving trajectory 8 of the fourth phase P4. This unusual driving trajectory 8 additionally warns the surroundings of the vehicle 1. In addition, a flashing emergency indicator 9 can indicate that the emergency assistant is active. A further warning to the surroundings can also be issued, for example, by activation of the flashing warning indicator light system 10.

When the emergency speed, which is, for example, 60 km/h on the central lane, is reached, the fifth phase P5 of the method sequence is reached, in which fifth phase P5 longitudinal and lateral guidance and all the warnings are deactivated on the assumption of an uncritical traffic situation. An uncritical traffic situation means here that the further road profile does not have a critical curvature and that no critical approach to a vehicle traveling ahead is detected. Although it appears at first sight that the vehicle in the fifth phase P5 is more or less left to itself, the consequences of an accident of the vehicle at the specified emergency speed are less serious, in particular since it is highly probable that the vehicle will leave the roadway in a foreseeable time. In addition, a tail-end accident with a vehicle traveling behind is less serious owing to the relative speed than with a vehicle in a stationary state on the lane.

As already mentioned, the emergency method is based on the detection of a hands-off situation, wherein after the detection of such a hands-off situation it is not possible to draw any conclusions as to whether in fact an emergency is present or whether a technically adept driver is attempting autonomous driving utilizing the lateral guidance support for a certain time. It is then to be assumed that actual incapacity of the driver to drive is an improbable event. Consequently, the emergency behavior illustrated in FIG. 1 will become active only in the rarest of cases. The triggering of the emergency method by the hands-off detection is to be balanced against misuse by the driver who intentionally activates the method unnecessarily by letting go of the steering wheel. To counter misuse, it is checked with the hands-off warning 6 whether a predefined blocking condition is satisfied. If the blocking condition is satisfied, entering into the escalation phase P4 and therefore initiation of the emergency method is prevented. If the blocking condition is not satisfied, the method enters the escalation phase P4 and the method runs in the described fashion. In this way, misuse of the emergency method is counteracted.

In the embodiment described above, the blocking condition is a function of instances of triggering of the escalation phase P3 which have already taken place. The blocking condition is therefore satisfied if the number of instances of triggering of the escalation phase P3 is equal to a predefined value. In other words, after a defined number of instances of triggering of the escalation phase, no further triggering takes place when a hands-off situation has been detected and the emergency function is therefore blocked, wherein the blocking could be configured in such a way that it can be canceled only in a customer workshop. If such a blocking of the emergency function occurs, the lateral guidance support following the hands-off warning 6 will usually be deactivated if there is no driver reaction to the hands-off warning, since otherwise autonomous driving would be possible.

It is also possible to limit the blocking condition to the number of instances of triggering of the escalation phase P3 within one driving period z. In other words, the number of instances of triggering of the escalation phase is limited to one driving period, wherein one driving period is defined by the starting of the vehicle at a starting point and the shutting down of the vehicle after the destination has been reached. In this way, it would be possible to limit the availability of the emergency method to triggering during one driving period, for example.

If the driver becomes incapable of driving again in the escalation phase P3 or the intervention phase, or the driving behavior of the vehicle 1 in the specified phases P3, P4 becomes too uncomfortable to the conscious driver, the emergency method is ended by an active intervention in the control of the vehicle by the driver. A braking process, a steering intervention or some other driver-side intervention such as, for example, operator control of the ACC switch, can be evaluated as an active intervention. However, operator control of the ACC switch in phases P3 and P4 would signal a driver activity with which he would reset the method back to the second phase P2 in which the lateral guidance support would again be available to the driver without the driver having taken hold of the steering wheel. In this way, autonomous driving would be possible over a relatively long time period as long as the blocking condition is not satisfied. To avoid this, after the emergency method has been interrupted the lateral guidance support is available to the driver again only after an active steering intervention.

Figure 2:
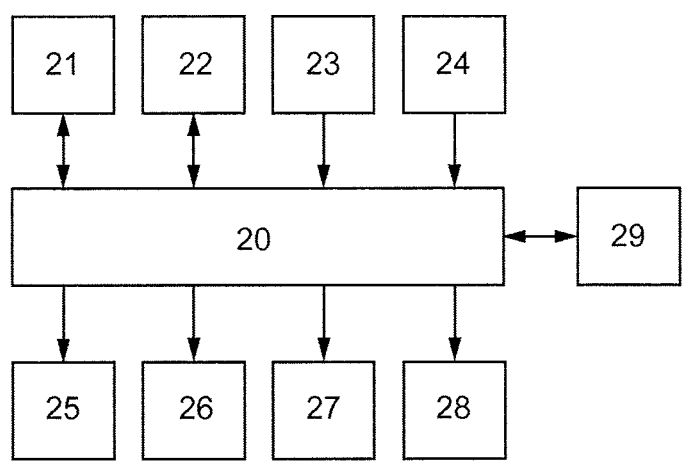
FIG. 2 shows a block diagram of the device for carrying out the method.

FIG. 2 shows in a schematic illustration the disclosed device whose core component is formed by an emergency assistant 20. The emergency assistant 20 is connected to a lateral guidance apparatus 21 and a longitudinal guidance apparatus 22. A lateral guidance apparatus 21 is, for example, a lanekeeping device or a lane assist. For example an adaptive cruise controller, that is to say an ACC, or an emergency braking assistant is possible as a longitudinal guidance apparatus 22. In addition, the emergency assistant 20 receives information from a hands-off detection 23 and a device 24 for detecting a steering activity of the driver.

On the basis of the result of the hands-off detection 23, the emergency assistant 20 generates suitable warnings 25 of an acoustic, visual and/or haptic nature and carries out steering interventions 26, braking interventions 27 and interventions into the drive train 28.

In addition, the device has a blocking apparatus 29. In the event of a detection of a hands-off of the hands-off detection 23, which serves to trigger the emergency method, the emergency apparatus 20 transfers this triggering information to the blocking apparatus 29 which forms and stores the total sum of the instances of triggering of the emergency apparatus by using the number of instances of triggering which have already taken place. If the sum which is formed is greater than or equal to a predefined blocking value, the triggering of the emergency method, i.e. the entry into the escalation phase P3, is prevented by the blocking apparatus. If this does not occur, the entry into the escalation phase P3 takes place.

In the field of active safety of a motor vehicle, contemporary driver assistance systems are already able to perform driving tasks of the driver of a motor vehicle and to carry out partially automated or partially autonomous driving functions. This is manifest in the examples of adaptive cruise control or lane assist or heading control.

Document DE 10 2006 052 481 A1 discloses a method for operating a motor vehicle having at least one driver assistance system, wherein there is provision that the driver has the possibility of activating the driver assistance system in critical situations. After the activation, the driver assistance system exercises control over the vehicle without further intervention by the driver.

However, such driver assistance systems can tempt the driver of a vehicle to use the driver assistance systems for completely autonomous driving, which is not permissible. To counteract this, it is possible to attempt to determine whether the driver is actively controlling the vehicle or, as it were, driving "hands-free".

Document DE 10 2006 056 094 A1 discloses a monitoring device for monitoring the current state of the driver of a motor vehicle, wherein the monitoring device can have a steering wheel sensor by means of which it can be detected whether or not the driver has taken hold of the steering wheel. If inactivity of the driver is detected, in a first step, a warning is output to activate the driver. If this warning is ignored, an active assistance system which supports the control of the vehicle is deactivated after a further message, wherein in addition forced braking of the vehicle to a stationary state can be initiated.

To detect the driver activity, document DE 10 2009 028 647 A1 describes a method for detecting the operating state of the steering wheel of a motor vehicle. In this context, a steering torque which is applied at a particular time by the driver is determined as a function of the steering wheel angle and the steering torque. On the basis of the profile of the driver steering torque it can be determined whether or not the driver has his hands on the steering wheel, that is to say a hands-on/hands-off detection is being carried out.

However, these driver assistance systems are not configured for partial or total failure of the driver of the motor vehicle. Such failure of the driver to carry out the driving functions for which he is responsible can be caused, for example, by excessive fatigue or by a suddenly occurring health problem of the driver. Excessive fatigue often brings about momentary nodding off and an associated brief loss of control of the vehicle. A health problem is understood here to be physical incapacity of the driver to control the motor vehicle, and can be caused, for example, by a sudden heart attack. Such situations often lead to serious accidents, in particular if the vehicle is moving at a high speed on a freeway or a road similar to a freeway.

Since such situations which result in accidents also occur as a result of health problems, in particular heart problems and circulation problems, of relatively old people, the BMFT (Getman Ministry for Education and Research) started the SmartSenior project which has the purpose of developing technical measures for helping elderly people to continue to participate in everyday life. Within the scope of this project, an emergency stopping assistant was developed for ensuring a motor vehicle is stopped safely in the event of a sudden incapacity of the driver of the vehicle to drive.

The publication P. Waldmann et al.: "Der Nothalteassistent—abgesichertes Anhalten bei plötzlicher Fahrunfähigkeit des Fahrzeugführers [The emergency stopping assistant—safe stopping in the event of sudden incapacity of a vehicle driver to drive]", 3rd Deutscher AAL-Kongress [German AAL Conference], Jan. 26-27, 2010, Berlin, transcript of conference, ISBN 978-3-8007-3209-8, VDE Verlag Berlin, describes such an emergency stopping assistant. In this context, the emergency stopping assistant for the detected case of physical incapacity of the driver of the vehicle is intended to avoid an accident and to transfer the vehicle into a safe state. Should this not be possible owing to a complex traffic situation, at least the energy of the vehicle must be reduced as far as possible to reduce the consequences of the accident. A precondition for the emergency stopping assistant is reliable detection of the physical incapacity of the driver of the vehicle, which includes a complex sensor system and an evaluation.

However, the emergency stopping assistant remains to transfer the vehicle into a safe state, i.e. into the stationary state, wherein the emergency stopping assistant is designed here exclusively for use on freeways and main roads which are similar to freeways. In this case, the safe state of the vehicle is ensured in an ideal case by a stationary state on the breakdown lane, wherein to reach the breakdown lane the emergency stopping assistant may, under certain circumstances, have to perform a lane change.

The automated emergency stop on a breakdown lane requires not only reliable lateral guidance and longitudinal guidance, brought about by means of the ACC and the lane assist, but also the possibility of a safe lane change. For this purpose, the emergency stopping assistant must be equipped with a complex surroundings-sensing sensor system to sense objects in the 360° surroundings of the vehicle and track them as well as have a precise digital map for precise vehicle guidance. However, if, for example, the traffic density is so high that a lane change proves to be too difficult, the vehicle is braked to the stationary state within the current driving lane.

Although the traffic behind will be taken into account when this emergency stop is made within the vehicle's own lane on a freeway or a main road which is similar to a freeway, at the speeds which are customary on a freeway, it is possible, owing to the high relative speed between the stationary vehicle and the following traffic, for tail-end collisions to occur with a high input of energy into the stationary vehicle, which can lead to serious consequences of the collision. In addition, in the known emergency stopping system a costly surrounding sensor system is necessary.

In known emergency stopping assistants, on the one hand, the requirements made of the necessary complex sensor system, in particular that to detect the incapacity to drive, are very stringent and, on the other hand, in the case of a stopping process to a stationary state of the vehicle outside a safe emergency lane or breakdown lane there is the risk of tail-end collisions with a high input of energy. In addition to safe detection of physical incapacity, it must also be ensured that the assistance systems which are used and which permit at least partial autonomous driving are not misused by a technically adept driver.

LIST OF REFERENCE SYMBOLS

P1 First phase
P2 Second phase
P3 Third phase
P4 Fourth phase
P5 Fifth phase
1 Vehicle
2 Lane
3 Marks
4 Driving trajectory first phase
5 Driving trajectory second phase
6 Acoustic/visual warning
7 Driving trajectory escalation phase emergency assistant
8 Driving trajectory intervention phase emergency assistant
9 Visual display emergency assistant
10 Flashing warning indicator light
20 Emergency assistant
21 Lateral guidance apparatus
22 Longitudinal guidance apparatus
23 Hands-off detection
24 Detection of steering activity
25 Acoustic/visual/haptic warning
26 Steering intervention
27 Braking intervention
28 Drive train intervention
29 Blocking apparatus

The invention claimed is:

1. A method for transferring a vehicle traveling with lateral guidance support into a driving state with a reduced risk of collision in response to a driver of the vehicle experiencing an emergency, wherein the speed of the vehicle is higher than a predefined speed limit, the method comprising:
   detecting a hands-off situation of the driver during a hands-off phase of vehicle operation;
   outputting a hands-off warning during the hands-off phase of vehicle operation based on the detection of the hands-off situation;
   initiating an escalation phase of vehicle operation during the hands-off phase of vehicle operation based on whether a predefined blocking condition is satisfied; and
   performing a warning escalation, during the escalation phase, in response to detection of no reaction to the hands-off warning during the hands-off phase.

2. The method of claim 1, wherein the blocking condition is a function of instances of triggering of the escalation phase of vehicle operation which have already taken place during operation of the vehicle, and the blocking condition is satisfied by a number of instances of triggering of the escalation phase being equal to a predefined value.

3. The method of claim 2, wherein the number of instances of triggering of the escalation phase of the vehicle operation within one driving period is equal to the predefined value.

4. The method of claim 1, further comprising reducing vehicle speed during an intervention phase to a speed which is lower than or equal to a speed limit, wherein the vehicle is kept on a current lane in response to detection of no driver reaction to the warning escalation during the escalation phase of vehicle operation, and deactivating all longitudinal and lateral guidance for the vehicle as well as all warnings in response to the vehicle reaching the speed limit.

5. The method of claim 4, wherein,
   during the escalation phase of vehicle operation, lateral guidance support intervention takes place at a later time compared to lateral guidance support intervention otherwise, wherein the later time is selected as a function of the vehicle speed such that the vehicle is prevented from exiting the current lane, and,
   during the intervention phase, the warning escalation is intensified by virtue of the fact that at least the lateral guidance of the vehicle has a jerky lateral profile.

6. The method of claim 1, wherein the lateral guidance support in the escalation phase or in the intervention phase is actuated again by the driver only in response to a steering intervention of the driver being detected.

7. A device for transferring a vehicle traveling with lateral guidance support into a driving state with a reduced risk of the consequences of a collision in the event of the driver experiencing an emergency, the device comprising:
   a longitudinal guidance apparatus;
   a lateral guidance apparatus;
   a hands-off detection apparatus;
   an emergency assistant for carrying out warning escalations and interventions into the driving functions of the vehicle as a function of the results of the hands-off detection apparatus; and
   a blocking apparatus for blocking the emergency assistant based on satisfaction or non-satisfaction of a predefined blocking condition,
   wherein, subsequent to the emergency assistant detecting a hands-off situation of the driver and outputting a hands-off warning in a hands-off phase, the emergency assistant initiates an escalation phase during the hands-off phase of vehicle operation based on whether the predefined blocking condition is satisfied, and performs a warning escalation, during the escalation phase, in response to detection of no reaction to the hands-off warning during the hands-off phase.

8. The device of claim 7, wherein the blocking apparatus blocks the emergency assistant as a function of instances of activation of the emergency assistant which have already taken place, wherein the blocking condition is satisfied based on the number of instances of activation being equal to a predefined value.

9. The device of claim 8, wherein, after a positive hands-off detection, the emergency assistant carries out the warning escalation in at least two successive driving phases, including an escalation phase and a subsequent intervention phase, wherein, in response to unsuccessful running of the intervention phase when a speed limit is reached, the emergency assistant deactivates at least the longitudinal guidance apparatus and the lateral guidance apparatus.

10. The device of claim 7 further comprising an apparatus for detecting driver steering activity.

* * * * *